United States Patent
Iten

[11] 3,772,493
[45] Nov. 13, 1973

[54] ELECTRICAL DISCHARGE MACHINING APPARATUS
[75] Inventor: Oscar Iten, Savosa, Switzerland
[73] Assignee: R. C. F. S.p.A., Milan, Italy
[22] Filed: June 8, 1972
[21] Appl. No.: 261,028

[52] U.S. Cl. .............................................. 219/69 G
[51] Int. Cl. ............................................... B23p 1/14
[58] Field of Search ............. 219/69 D, 69 E, 69 G, 219/69 R, 69 V

[56] References Cited
UNITED STATES PATENTS
3,454,738   7/1969   Brookshire ........................ 219/69 V
3,366,770   1/1968   Blatt et al. ........................ 219/69 G Primary Examiner—R. F. Staubly
Attorney—Luke A. Mattare et al.

[57] ABSTRACT

The invention relates to electrical discharge machining apparatus including a tool electrode carried on a tool electrode holder and movable along a substantially vertical control axis towards and away from a workpiece by positional control gear, acting on a rod connected to the tool electrode holder. The workpiece is fixed in relation to a rigid frame machine which includes a rigid gantry located above the workpiece. The gantry mounts bearing means through which the said rod extends for axial sliding movement along the control axis. At least two shafts are located symmetrically about the rod connecting the positional control gear and the tool electrode holder. Each shaft extends parallel to the control axis and each shaft is connected at its lower end to the tool electrode holder and extends upwardly therefrom through bearing means carried by the gantry. A pneumatic piston and cylinder assembly is associated with an upper region of each shaft and there are means supplying compressed pneumatic fluid to the piston and cylinder assemblies associated with the respective shafts to support the weight of the tool electrode and the tool electrode holder connected to the lower ends of the shafts. The cylinders are vented to atmosphere by way of relief valves arranged to open when pneumatic pressure in the cylinders exceeds a predetermined amount.

2 Claims, 2 Drawing Figures

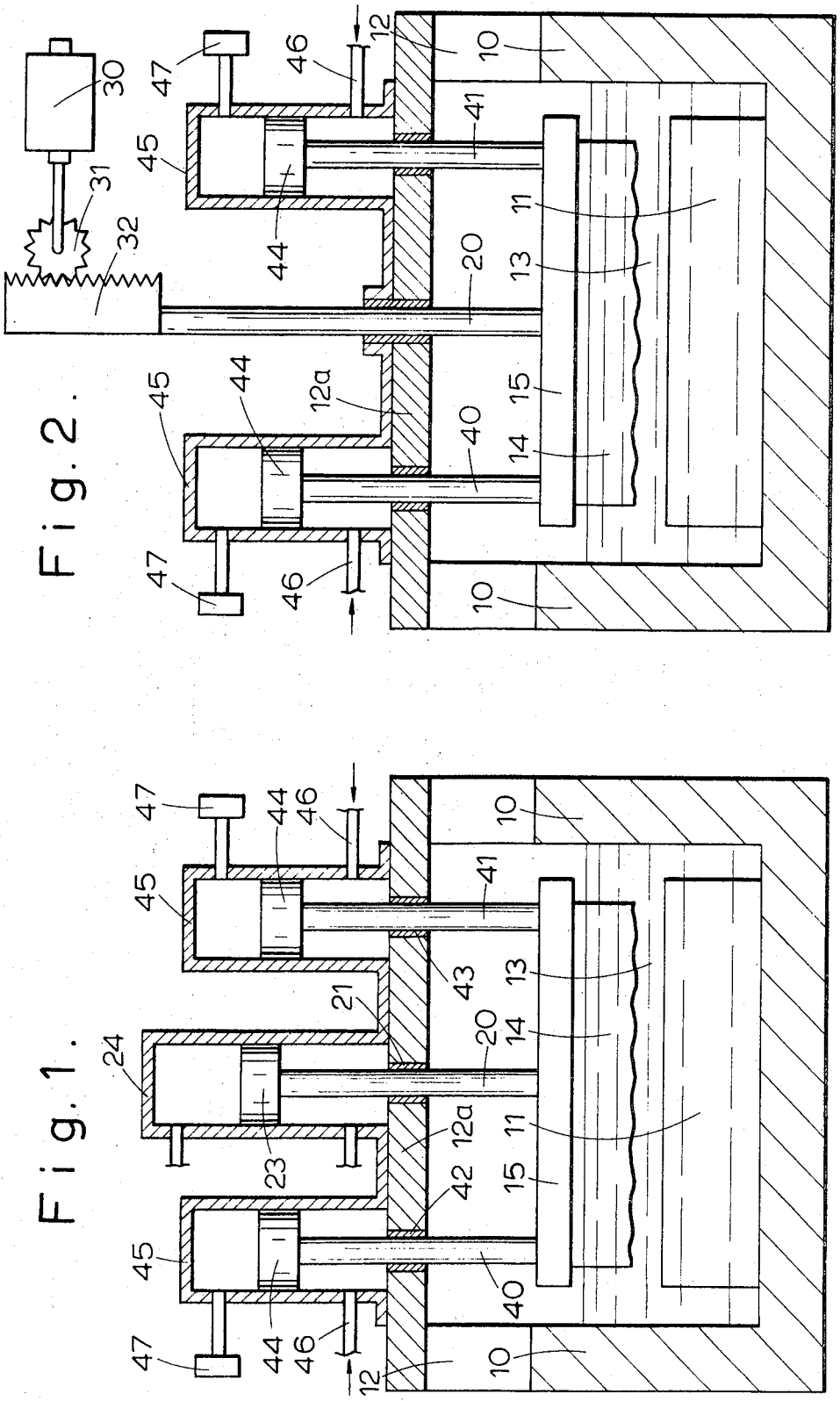

ELECTRICAL DISCHARGE MACHINING APPARATUS

This invention relates to electro-erosion machining apparatus also known as electrical discharge machining apparatus for cutting or working electrically conductive materials, such as hard metals and tool steels.

Most current modern electro-erosion machines operate by means of supply unidirectional pulsed discharges between a tool electrode and a workpiece in the presence of a dielectric fluid. The pulsed discharges are derived from a power supply by periodically rendering conductive an electronic switch which is in series circuit with the spark gap and the power supply, this electronic switch being periodically rendered conductive by an actuating device which may be in the form of a multi-vibrator in circuit with an amplifying means, the latter delivering timed actuating pulses to the said electronic switch. The pulses are desirably as nearly rectangular as possible and the multivibrator or similar actuating device is equipped with means for adjusting the frequency of the output pulses and for adjusting the ON/OFF ratio of the output pulses. By these adjustment means the duration of each discrete pulsed discharge across the gap between the tool electrode can be adjusted at various repetition frequencies.

During each working discharge the gap is ionized. If the gap remains ionized an arc would be formed between the tool electrode and the workpiece electrode, which if maintained, would cause undue damage to the electrodes.

Machine tools utilizing the principles described above are well known and in a common form the workpiece is clamped to a worktable located in a bath of dielectric fluid. Arranged above the bath is controlled positioning gear, for example an hydraulic servo system, including a piston and cylinder, the piston having a rod mounting at its lower end a holder carrying the tool electrode and by means of which the vertical movement of the tool electrode can be closely controlled.

Instead of employing an hydraulic servo system as positional control gear, the electrode may be carried at the lower end of a rod which is raised and lowered along the control axis by means of electro-mechanical drive means acting on an upper end of the rod.

In practice, the tool electrode holder is lowered by the positioning gear so that the tool electrode is brought into close proximity with the workpiece and is subsequently lowered during the erosion process to maintain the gap between the tool electrode and workpiece such that the gap is neither so small that deionization fails to occur, nor so large that the gap presents resistance high enough to prevent the passage of discharges between the electrode and workpiece. Since the positional control requires to be of high quality, the positioning gear effecting advance and retraction of the tool electrode holder is operable along a single substantially vertical axis. Such single substantially vertical axis is hereafter referred to as a control axis.

Control signals for the positional control gear are derived from gap sensing means which respond to deviations of current flow or gap voltage to effect raising of the tool electrode when short circuit conditions arise and lowering of the electrode when the gap is opened so wide that machining discharges cease.

However in some applications, for example in the formation of large dies for use in the pressing of panels for motor vehicle bodies, the tool electrodes and the associated holders are of comparatively large size and may weigh in excess of 1,000 lbs and even upwards of 15,000 lbs.

Even with such heavy electrodes it is necessary to control the size of the working gap during the electrical discharge machining process such that the gap is neither so small that deionization fails to occur, nor so large that the gap presents resistance high enough to prevent the passage of discharges between the tool electrode and the workpiece.

This invention has for its object to provide means for counter balancing a tool electrode and associated tool electrode holder which together weigh in excess of 1,000 lbs in such manner that the positional control gear adapted to move the tool electrode along the control axis is substantially relieved of the weight of the tool electrode and its associated holder, it being understood that the positional control gear is still required to overcome the inertia of these elements in effecting positional control along the control axis and needs to have sufficient power capacity to this end.

Accordingly the invention provides electrical discharge machining apparatus including a tool electrode carried on a tool holder and movable along a substantially vertical control axis towards and away from a workpiece by positional control gear acting on a rod connected to the tool electrode holder, said workpiece being fixed in relation to a rigid frame of the machine, and said machine frame including a rigid gantry located above the workpiece, said gantry mounting bearing means through which said rod extends for axial sliding movement along said control axis characterised by at least two shafts located symmetrically above the rod connecting the positional control gear and the tool electrode holder, each shaft extending parallel to the control axis and being connected to the tool electrode holder and extending upwardly therefrom and including, anchored to said gantry, a pneumatic piston and cylinder assembly associated with an upper region of each shaft, and means supplying compressed pneumatic fluid to the piston and cylinder assemblies associated with the respective shafts whereby to support the weight of the tool electrode and tool electrode holder connected to the lower ends of the shafts.

The piston and cylinder assemblies will be connected to the associated shaft while the cylinder will be rigidly connected to the gantry. Moreover, the upper region of each cylinder will be vented to atmosphere by way of relief valve means arranged to open when pneumatic pressure in the said upper region of the cylinder exceeds a predetermined amount.

At least two shafts each with an associated piston and cylinder assembly are provided located symmetrically about the rod connecting the tool holder with the positional control gear so that the lateral forces on the rod can be substantially balanced and so that movement along the control axis can be effected smoothly. To this end also the bearings carried by the gantry for the rod and the bearing carried by the gantries of the cylinders for the shafts are of pressure lubricated type.

The pressure of pneumatic fluid supplied to the piston and cylinder assemblies is adjustable so that electrodes and electrode holders of different weights can be balanced by adjustment to a suitable supply pressure.

The invention is illustrated by way of example in the accompanying diagrammatic drawings which are cross-sectional views taken from the side through the control axis of electrical discharge machining apparatus and in which:

FIG. 1 shows the apparatus with hydraulic positional control gear while

FIG. 2 shows the apparatus with electro-mechanical positional control gear.

Referring now and more particularly to FIG. 1 of the drawings, part of an electrical discharging machining apparatus is here shown in which 10 represents part of a rigid frame of the machine. A workpiece 11 required to be machined is fixed to the frame part 10.

The frame of the machine also includes a rigid gantry shown diagrammatically at 12, part of which at 12a overlies the workpiece 11. The workpiece 11 is immersed in a bath of dielectric fluid 13, while 14 represents a tool electrode carried on a tool electrode holder 15.

During machining unidirectional pulse discharges are applied between the tool electrode 14 and the workpiece 11 and during each working discharge, the gap between the tool electrode and the workpiece is ionised. In practice, the tool electrode holder 15 is lowered by positioning gear, to be described below, so that the electrode 14 is brought into close proximity with the workpiece and during the erosion process, the positioning gear is arranged to maintain the gap between the tool electrode 14 and the workpiece 11 such that the gap is neither so small that deionisation fails to occur, nor so large that the gap presents resistance high enough to prevent the passage of discharges across it.

The positional control gear provided in the apparatus according to the invention is of known form.

Thus referring to FIG. 1, in this embodiment the positional control gear comprises a rod 20 connected at its lower end to the electrode holder 15. The rod 20 extends upwardly from the electrode holder 15 through the gantry part 12a where it is guided by bearing means generally designated 21 so that the rod is capable of sliding along a substantially vertical axis, referred to herein as the control axis.

At its upper end the rod 20 is connected to a piston element 23 slidable in a hydraulic cylinder 24. Means not shown are provided for varying the hydraulic pressure acting on the opposite sides of the piston 23 to effect movement of the latter in the cylinder 24 and hence upwards or downwards moment of the rod 20 along the control axis.

In FIG. 2, similar reference numerals are implied for like or equivalent parts to those above described with reference to FIG. 1. This embodiment differs only in that the control rod 20 is acted on at its upper end by electro-mechanical positional control gear represented diagrammatically by a servo motor 30 driving a pinion 31 enmeshed with a rack 32.

Control signals for the positional control gear, that is either the hydraulic servo system shown diagrammatically in FIG. 1, or the electro-mechanical system shown diagrammatically in FIG. 2, are derived from gap sensing means, also of one of the many forms well known in the art. Such gap sensing means are commonly arranged respond to deviations of current flow or voltage across the working gap and through the positional control system effect of the tool electrode 14 when short circuit conditions arise, and lowering of the tool electrode 14 when this gap is open so wide that the machining discharges ceases. Hence in this manner the positional control gear maintains the working gap at the required dimension.

When the tool electrode and the associated electrode holder are small and relatively light, the positional control gear can readily be given sufficient power and capacity to bear the weight of the tool electrode and its associated holder and move these elements efficiently as required along the control axis. The present invention is however concerned with the case where the tool electrode 13 and its associated electrode holder 14 are relatively heavy.

In the case of the formation of large dies for use in the pressing of motor body panels the tool electrode and its associated electrode holder may weigh upwards of 15,000 lbs.

According to the present invention, means are provided for counter-balancing the tool electrode and its associated holder in such manner that the positional control gear is substantially wholly relieved of the weight of the tool electrode and its associated holder. To this end the invention provides at least two shafts 40 and 41 located symmetrically about the control rod 20, the axis of each shaft 40 and 41 extending parallel to the control axis. Each shaft 40 and 41 is connected at its lowest end to the electrode holder, the shafts 40 and 41 extending upwardly in the embodiments diagrammatically shown through bearings generally designated 42 and 43 respectively, carried in gantry part 12a. Each shaft 40 and 41 is connected at its upper end to a piston element 44 slidable in a pneumatic cylinder 45.

Instead of the bearing means 42 and 43 for the shafts being carried by the gantry, they may be constituted by pressure lubricated seals provided at the lower ends of the cylinders. Furthermore the cylinders 45 may not be mounted so that they are located wholly above the gantry as shown in the drawings which are purely diagrammatic.

Compressed air under pressure is fed to each cylinder to act on the lower side of each piston 44 through inlet pipes 46. Means not shown are provided for adjusting the pressure of the air supply through the pipes 46 so that the force acting at the undersides of the pistons 44 is sufficient to support the weight of the electrode 14 and the associated electrode holder 15. The spaces in the cylinders 45 on the upper sides of the pistons 44 are vented to atmosphere by way of relief valves 47, the arrangement being such that the valves 47 open when the air pressure acting on them exceeds a predetermined amount.

Although in the embodiment shown, only two counter-balancing pneumatic piston and cylinder assemblies are provided, three or more cylinders may, if desired, be applied. However an important feature of the invention is that the shafts associated with the counter-balancing pneumatic piston and cylinder assemblies are spaced symmetrically about control rod 20 so that lateral forces on the control rod are negligible, with the result that movement along the control axis is effected smoothly. The bearings 21, 42 and 43 are preferable of the pressure lubricated type, this again assisting in providing smoothness of movement along the control axis.

I claim:

1. Electrical discharge machining apparatus, including a tool electrode carried on a tool electrode holder and movable along a substantially vertical control axis towards and away from a workpiece by positional control gear acting on a rod connected to the tool electrode holder, said workpiece being fixed in relation to a rigid machine frame which latter includes a rigid gantry located above the workpiece, said gantry mounting bearing means through which said rod extends for axial sliding movement along said control axis, and including at least two shafts located symmetrically about the said rod connecting the positional control gear and the tool electrode holder, each shaft extending parallel to the control axis and each shaft being connected at its lower end to the tool electrode holder and extending upwardly therefrom, and including anchored to said gantry, a pneumatic piston and cylinder assembly associated with an upper region of each shaft, there being means supplying compressed pneumatic fluid to the piston and cylinder assemblies associated with the respective shafts, whereby to support the weight of the tool electrode and the tool electrode holder connected to the lower ends of the shafts, and wherein each shaft is connected at its upper end to a piston of said piston and cylinder assembly, the cylinder being anchored to the gantry and wherein upper regions of the cylinders are vented to atmosphere by way of relief valves means arranged to open when pneumatic pressure in the upper regions of the cylinders exceeds a predetermined amount.

2. Electrical discharge machining apparatus, including a tool electrode carried on a tool electrode holder and movable along a substantially vertical control axis towards and away from a workpiece by positional control gear acting on a rod connected to the tool electrode holder, said workpiece being fixed in relation to a rigid machine frame which latter includes a rigid gantry located above the workpiece, said gantry mounting bearing means through which said rod extends for axial sliding movement along said control axis, and including at least two shafts located symmetrically about the said rod conecting the positional control gear and the tool electrode holder, each shaft extending parallel to the control axis and each shaft being connected at its lower end to the tool electrode holder and extending upwardly therefrom, and including anchored to said gantry, a pneumatic piston and cylinder assembly associated with an upper region of each shaft, there being means supplying compressed pneumatic fluid to the piston and cylinder assemblies associated with the respective shafts, whereby to support the weight of the tool electrode and the tool electrode holder connected to the lower ends of the shafts, and wherein each said cylinder is vented to atmosphere by way of relief valve means arranged to open when pneumatic pressure opposing movement of an associated piston in said cylinder exceeds a predetermined amount.

* * * * *